(12) United States Patent
Hoyer et al.

(10) Patent No.: US 9,703,968 B2
(45) Date of Patent: Jul. 11, 2017

(54) MECHANISMS FOR CONTROLLING TAG PERSONALIZATION

(71) Applicant: Assa Abloy AB, Stockholm (SE)

(72) Inventors: Philip Hoyer, Richmond (GB); Mark Robinton, Eden Prairie, MN (US); Petr Novak, Revnice (CZ)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 14/306,078

(22) Filed: Jun. 16, 2014

(65) Prior Publication Data

US 2015/0363599 A1 Dec. 17, 2015

(51) Int. Cl.
G06F 21/00 (2013.01)
G06F 21/60 (2013.01)
H04L 29/06 (2006.01)
G06F 21/62 (2013.01)

(52) U.S. Cl.
CPC ............ *G06F 21/606* (2013.01); *G06F 21/60* (2013.01); *G06F 21/6218* (2013.01); *G06F 21/6227* (2013.01); *H04L 63/08* (2013.01); *H04L 63/101* (2013.01); *G06F 2221/2129* (2013.01); *G06F 2221/2141* (2013.01); *G06F 2221/2153* (2013.01)

(58) Field of Classification Search
CPC ...... G06F 21/60; G06F 21/602; G06F 21/604; G06F 21/62; G06F 21/6218; G06F 21/6227
See application file for complete search history.

(56) References Cited

U.S. PATENT DOCUMENTS

| 7,295,114 | B1 | 11/2007 | Drzaic et al. |
| 7,942,312 | B2 | 5/2011 | van Ingen |
| 8,074,271 | B2 | 12/2011 | Davis et al. |
| 8,285,211 | B2 | 10/2012 | Wang et al. |
| 8,344,853 | B1 | 1/2013 | Warner et al. |
| 2006/0277061 | A1 | 12/2006 | Revanur et al. |
| 2008/0122584 | A1 | 5/2008 | Itasaki et al. |
| 2009/0055597 | A1* | 2/2009 | Robles ............... G06Q 20/341 711/147 |
| 2010/0079237 | A1 | 4/2010 | Falkk et al. |
| 2010/0299527 | A1 | 11/2010 | Arunan et al. |

(Continued)

FOREIGN PATENT DOCUMENTS

| CN | 102663591 | 9/2012 |
| EP | 1710764 | 10/2006 |

(Continued)

OTHER PUBLICATIONS

"Oberthur Technologies partners with HID Global to carry Seos digital keys on NFC SIM cards for mobile access," ASSA ABLOY, Jul. 17, 2013, 1 page [retrieved from: http://www.assaabloy.com/en/com/press-news/news/2013/oberthur-technologies/].

(Continued)

*Primary Examiner* — Edward Zee
(74) *Attorney, Agent, or Firm* — Sheridan Ross P.C.

(57) ABSTRACT

A tag and a method of writing data to memory of a tag are provided. The tag includes memory that stores data elements as well as an access control list that maps access keys to the data elements. An authentication protocol is employed by the tag to determine whether a data element received from a writing device will be written to the memory.

20 Claims, 10 Drawing Sheets

(56) References Cited

U.S. PATENT DOCUMENTS

| | | | |
|---|---|---|---|
| 2011/0025458 A1 | 2/2011 | Rokhsaz et al. | |
| 2011/0074552 A1 | 3/2011 | Norair et al. | |
| 2012/0159105 A1* | 6/2012 | von Behren et al. | 711/164 |
| 2012/0207305 A1 | 8/2012 | Gallo et al. | |
| 2012/0265988 A1 | 10/2012 | Ehrensvard | |
| 2013/0061303 A1 | 3/2013 | Hart et al. | |
| 2013/0102252 A1* | 4/2013 | Rasmussen | H04K 1/04 455/41.2 |
| 2013/0344808 A1 | 12/2013 | Murray et al. | |
| 2014/0023195 A1 | 1/2014 | Lee et al. | |
| 2014/0173708 A1 | 6/2014 | Garlick | |
| 2015/0208245 A1 | 7/2015 | Robinton et al. | |
| 2016/0012696 A1 | 1/2016 | Robinton et al. | |
| 2016/0021091 A1 | 1/2016 | Hoyer et al. | |
| 2016/0021100 A1 | 1/2016 | Hoyer | |

FOREIGN PATENT DOCUMENTS

| | | |
|---|---|---|
| EP | 2487629 | 8/2012 |
| EP | 2518657 | 10/2012 |
| WO | WO 2008/028291 | 3/2008 |
| WO | WO 2011/089423 | 7/2011 |
| WO | WO 2012/103584 | 8/2012 |
| WO | WO 2013/034681 | 3/2013 |
| WO | WO 2013/072437 | 5/2013 |
| WO | WO 2014/140807 | 9/2014 |
| WO | WO 2014/140814 | 9/2014 |
| WO | WO 2014/140818 | 9/2014 |
| WO | WO 2014/177934 | 11/2014 |
| WO | WO 2015/001376 | 1/2015 |

OTHER PUBLICATIONS

International Preliminary Report on Patentability for International (PCT) Patent Application No. PCT/IB2013/001949, mailed Jan. 14, 2016 10 pages.

International Preliminary Report on Patentability for International (PCT) Patent Application No. PCT/IB2014/001558, mailed Sep. 24, 2015 7 pages.

International Preliminary Report on Patentability for International (PCT) Patent Application No. PCT/IB2014/000853, mailed Sep. 24, 2015 10 pages.

International Preliminary Report on Patentability for International (PCT) Patent Application No. PCT/IB2014/000812, mailed Sep. 24, 2015 8 pages.

U.S. Appl. No. 14/772,011, filed Sep. 1, 2015, Hoyer et al.

U.S. Appl. No. 14/897,708, filed Dec. 11, 2015, Hoyer et al.

International Preliminary Report on Patentability for Internations (PCT) Patent Application No. PCT/IB2015/000843, mailed Sep. 24, 2015 8 pages.

"EMV—Integrated Circuit Card Specifications for Payment Systems. Book 2: Security and Key Management," EMVCo, LLC, Jun. 2008, Version 4.2, 177 pages [retrieved from: http://www.iro.umontreal.ca/~salvail/securite/notes2010/EMVv4.2Book2.pdf].

"EPC Radio-Frequency Identity Protocols Generation-2 UHF RFID Specification for RFID Air Interface, Protocol for Communications at 860MHz-960MHz, Version 2.0.0 Ratified," GS1 EPCglobal Inc., Nov. 1, 2013, pp. 1-152 [retrieved from: http://www.gs1.org/sites/default/files/docs/uhfc1g2/uhfc1g2_2_0_0_standard_20131101.pdf].

Emms et al. "The Dangers of Verify PIN on Contactless Cards," Computing Science, Technical Report Series, No. CS-TR-1332, May 2012, 14 pages [retrieved from: http://www.cs.ncl.ac.uk/publications/trs/papers/1332.pdf].

Falk et al. "Application of Passive Asymmetric RFID Tags in a High-Assurance Avionics Multi-Domain RFID Processing System," RFID Systems and Technologies (RFID SysTech), 2008 4th European Workshop, Jun. 11, 2008 8 pages [retrieved from: http://ieeexplore.ieee.org/stamp/stamp.jsp?arnumber=05755752].

Kilas et al. "Digital Signatures on NFC Tags Master of Science Thesis," Mar. 18, 2009, 53 Pages [retrieved from: http://web.it.kth.se/~johanmon/theses/kilas.pdf].

Leicher et al. "Smart OpenID: A Smart Card Based OpenID Protocol," IFIP Advances in Information and Communication Technology, 2012, vol. 376, pp. 75-86.

Pearson "Securing the Pharmaceutical Supply Chain with RFID and Public-key infrastructure (PKI) Technologies," Texas Instruments, Jun. 2005, White Paper, 12 pages.

Piramuthu "Lightweight Cryptographic Authentication in Passive RFID-Tagged Systems," IEEE Transactions on Systems, Man, and Cybernetics: Part C: Applications and Reviews, May 2008, vol. 38, No. 3, pp. 360-376.

Saeed et al. "Off-line NFC Tag Authenticiation," The 7th International Conference for Internet Technology and Secured Transactions, 2012 International Conference for IEEE, Dec. 10, 2012, pp. 730-735.

Saros et al. "A Platform for Pervasiv Infrastructures," Next Generation Mobile Applications, Services and Technologies, 2009, NGMAST '09, Third International Conference on IEEE, Piscataway, NR, USA, Sep. 15, 2009, pp. 83-88.

Tan et al. "A Robust and Secure RFID-Based Pedigree System (Short Paper)," Information and Communications Security Lecture Notes in Computer Science, Jan. 2006, pp. 21-29.

Vassilev et al. "Personal Brokerage of Web Service Access," Security & Privacy, Sep. 2007, vol. 5, No. 5, pp. 24-31.

International Search Report and Written Opinion for International (PCT) Patent Application No. PCT/IB2013/002617, mailed Feb. 19, 2014 12 pages.

International Preliminary Report on Patentability for International (PCT) Patent Application No. PCT/IB2013/002617, mailed Mar. 19, 2015 8 pages.

International Search Report and Written Opinion for International (PCT) Patent Application No. PCT/IB2013/001949, mailed Feb. 25, 2014 15 pages.

International Search Report and Written Opinion for International (PCT) Patent Application No. PCT/IB2014/001558, mailed Nov. 12, 2014 11 pages.

International Search Report and Written Opinion for International (PCT) Patent Application No. PCT/IB2014/000853, mailed Sep. 17, 2014 15 pages.

International Search Report and Written Opinion for International (PCT) Patent Application No. PCT/IB2014/000812, mailed Sep. 18, 2014 13 pages.

International Search Report and Written Opinion for International (PCT) Patent Application No. PCT/IB2014/000843, mailed Sep. 12, 2014 13 pages.

International Search Report and Written Opinion for International (PCT) Patent Application No. PCT/IB2014/002157, mailed Feb. 17, 2015 12 pages.

International Search Report and Written Opinion for International (PCT) Patent Application No. PCT/IB2014/002986, mailed Jun. 30, 2015 19 pages.

* cited by examiner

MECHANISMS FOR CONTROLLING TAG PERSONALIZATION

FIELD OF THE DISCLOSURE

The present disclosure is generally directed toward data carriers and, in particular, toward controlling personalization of data carriers, such as tags.

BACKGROUND

There are multiple Radio Frequency Identification (RFID) and non-RFID tags in commerce that have the capability to store data. Four standards currently dominate RFID communication: ISO/IEC 14443-A, ISO/IEC 14443-B, ISO/IEC 15693, and JIS X6319-4, each of which are hereby incorporated herein by reference in their entirety. Other types of tags may employ Bluetooth® communication protocols, Near-Field Communications (NFC) protocols, Zigbee communication protocols, ZWave communication protocols, and the like. Data is often written to a tag using an appropriate writing device that communicates with the tag via an appropriate protocol. On the other side, a reading device is used to read the data from the tag, again via the appropriate protocol. It can be possible that a single device has reading and writing capabilities. One example of such a device is an NFC-equipped mobile device that operates in a read/write mode.

Industry efforts, such as the NFC forum, have defined specifications regulating the format of messages that are written on NFC-enabled tags (e.g., NFC Data Exchange Format (NDEF) message definition standards). Tags that communicate with other protocols have similar limitations on the format of messages that can be written thereto. Some of these standards do not, however, define how to control who can write data to a tag and/or when data can be written to the tag. This lack of control raises a serious issue. Specifically, regardless of the type of communication protocol used by the tag to communicate with other devices, data on a tag can be overwritten either accidentally or purposefully. Some proprietary solutions have the capability to switch off the tag's ability to have data written thereto, thereby avoiding the problem of overwriting data on the tag. As an example, the tag can be switched into a read-only mode of operation, thereby preserving all data written to the tag prior to switching the mode of operation of the tag.

The above-noted methods of protecting data on a tag have non-trivial shortcomings. On the one hand, if no write-protection controls are utilized, then anyone can write and modify the data on the tag. This is not acceptable in many applications where data on the tag needs to be trusted. On the other hand, if a read-only tag is utilized, then the tag cannot be modified once the tag is placed into the field. This strict control makes it difficult to enable flexible application development for the tags.

SUMMARY

It is, therefore, one aspect of the present disclosure to provide a tag with the ability to protect its memory from unauthorized write commands. Specifically, one or more data elements written to the tag may be protected with one or more access keys. The access keys may be used to specifically protect a predetermined location or portion of the tag's memory or, in other embodiments, the access keys may be used to specifically protect data elements after the data elements have been written to the tag's memory.

In some embodiments, the tag includes an access control applet that includes an access control list. The access control list may provide a mapping between access keys maintained in the access control applet and data elements stored in the access control applet. When a writing device attempts to write or overwrite a data element, the access control applet may utilize the access control list to compare a key received from the writing device with the access key(s) mapped to the data element being written or overwritten. More specifically, the access control applet may execute an authentication protocol in response to receiving a write request from a writing device. The authentication protocol may enable the access control applet to authenticate the writing device using one of the access keys stored in the access control applet. Once authenticated, the writing device may write a data element to the access control applet.

The data elements may be read from the access control applet via a separate data applet that is selected by a reading device. The data applet may copy the data elements from the access control applet and store the copied data elements in a data buffer. Data elements stored in the data buffer may then be provided to a reading device. By separating the applets and their functionality (e.g., one applet manages/controls write operations and another applet manages/controls read operations), the tag is able to protect the integrity of the data elements written to its memory and maintain standards compatibility from a reading operation perspective.

In one embodiment, a tag is provided that generally comprises:
    computer-readable memory including:
        an access control applet having the ability to store one or more data elements;
        one or more access keys;
        an access control list providing a mapping of the one or more access keys to the one or more data elements, wherein the access control applet implements an authentication protocol in response to receiving a write command from a writing device, the authentication protocol including confirming that the writing device is in possession of the one or more access keys prior to allowing the writing device to write a data element to the memory.

The one or more access keys may include a first access key and a second access key, where a first memory location has write permissions controlled by the first access key, and where a second memory location different from the first memory location has write permissions controlled by the second access key. In some embodiments, the first access key may be maintained exclusively by a manufacturer of the tag and the second access key may be shared with a personalization entity.

In some embodiments, a first data element is written to the first memory location by a first entity and a second data element is written to the second memory location by a second entity with reference to at least one of the first data element and the first memory location. Thus, any personalization of the tag that occurs after manufacturing of the tag may continue to reference the original data element(s) written to the tag by the manufacturer. Moreover, subsequent personalization events may also reference the first data element and/or the second data element.

The access keys may be maintained within the access control applet and may also be used for other purposes than simple authentication. For instance, the access keys can also used to create an encrypted communication channel between the writing device and the tag when writing the data element to the memory.

In some embodiments, the data element written to the memory may include an NDEF record.

In some embodiments, the access control applet may determine that the writing device is in possession of the one or more access keys by cryptographically proving that the writing device is in possession of the one or more access keys. In some embodiments, the access control applet determines that the writing device is in possession of the one or more access keys by receiving the one or more access keys from the writing device.

It is another aspect of the present disclosure to provide a separate applet within the memory that is responsible for handling read operations. The separate applet may correspond to a data applet that is separate from the access control applet. The data applet may be used to provide the one or more data elements to a reading device by obtaining the one or more data elements from the access control applet and then providing the one or more data elements to the reading device. Additionally, the data applet may be configured to a computational operation and/or cryptographic operation on the one or more data elements prior to providing such data elements to the reading device. Furthermore, the data applet may include a data buffer that temporarily stores copies of the one or more data elements in response to receiving a read request from the reading device and then provides the reading device with the copies of the one or more data elements. Further still, where the one or more data elements include at least two data elements, the data applet may be configured to concatenate the at least two data elements in a patterned template (e.g., an NDEF template, a Bluetooth template, etc.) specified by at least one of the one or more data elements.

As can be appreciated, the specific tag type is not limited to NFC tags. Instead, the tag may be configured to operate using at one of an NFC protocol, an Ultra-High Frequency (UHF) protocol, a High Frequency (HF) protocol, and a Bluetooth protocol. Other tag types may also benefit from the tag designs proposed herein.

In another embodiment, a method of writing data to memory of a tag is provided that generally comprises:

receiving, at the tag, a first write command from a first writing device;

receiving, at the tag, at least one of the following: (i) a first key from the first writing device or (ii) a nonce signed by the first key;

prior to executing the first write command at the tag, performing at least one of the following: (i) comparing the first key to one or more access keys stored in the memory and then authenticating the first writing device by confirming the first key received from the first writing device matches a first access key included in the one or more access keys or (ii) determining that the signed nonce is valid by regenerating the signature with the stored first key, wherein the one or more access keys are stored in an access control applet maintained in the memory of the tag;

upon authenticating the first writing device, completing the first write command by writing a first data element to the memory;

receiving, at the tag, a second write command from a second writing device;

receiving, at the tag, at least one of the following (i) a second key from the second writing device or (ii) a nonce signed by the second key;

prior to executing the second write command at the tag, performing at least one of the following: (i) comparing the second key to the one or more access keys and then authenticating the second writing device by confirming the second key received from the second writing device matches a second access key included in the one or access keys or (ii) determining that the signed nonce is valid by regenerating the signature with the stored first key; and upon authenticating the second writing device, completing the second write command by writing a second data element to the memory.

In some embodiments, the first writing device is different from the second writing device, the first data element is written to a first memory location, the second data element is written to a second memory location, and the first and second memory locations are write-protected by the first and second access keys, respectively.

In some embodiments, the first access key corresponds to a first private encryption key from a symmetric encryption key pair.

In some embodiments, the first write command and the second write command are received in one or more messages transmitted in accordance with at least one of a Near-Field Communications (NFC) protocol, an Ultra-High Frequency (UHF) protocol, a High Frequency (HF) protocol, and a Bluetooth protocol.

In some embodiments, the second data element references the first data element.

In some embodiments, the method may also include a process of reading the data element(s) from the tag's memory. Specifically, the method may further include:

receiving, at the tag, a read command from a reading device, the read command identifying a data applet as a selected data applet from which at least one of the first and second data elements are to be read from the tag;

in response to receiving the read command, copying at least one of the first and second data elements to a data buffer maintained in the selected data applet; and providing at least one of the first and second data elements to the reading device from the data buffer.

In responding to the read request, the tag may concatenate the first and second data element in a patterned template specified by one of the first and second data element. The patterned template may correspond to an NFC-specific template.

In some embodiments, when at least one of the first or second data elements are written to the memory an encrypted communications channel may be used, the encrypted communications channel may be encrypted with at least one of the following: (i) the first access key, (ii) the second access key, (iii) an ephemeral secure channel key generated using the first access key, (iv) an ephemeral secure channel key generated using the second access key, and (v) an ephemeral secure channel key generated using both the first and second access keys.

The present disclosure will be further understood from the drawings and the following detailed description. Although this description sets forth specific details, it is understood that certain embodiments of the invention may be practiced without these specific details.

DETAILED DESCRIPTION

Copyright and Legal Notices

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Embodiments of the present disclosure will be described in connection with an illustrative tag, a system for personalizing a tag, and other related processes. While most of the discussions herein refer to a "tag" as being the vehicle that has data elements written to a memory thereof and provides the data elements to a reading device, it should be appreciated that embodiments of the present disclosure are not so limited. Indeed, any type of device having a processor and memory capable of performing the functions of the tag discussed herein can be utilized without departing from the scope of the present disclosure. For instance, any form factor may be used. Examples of such form factors include card-type tags, key fobs, wristbands, smart tags embedded in clothing or other objects, smart watches, stickers, smart phones, laptops, tablets, etc.

Figure 1:
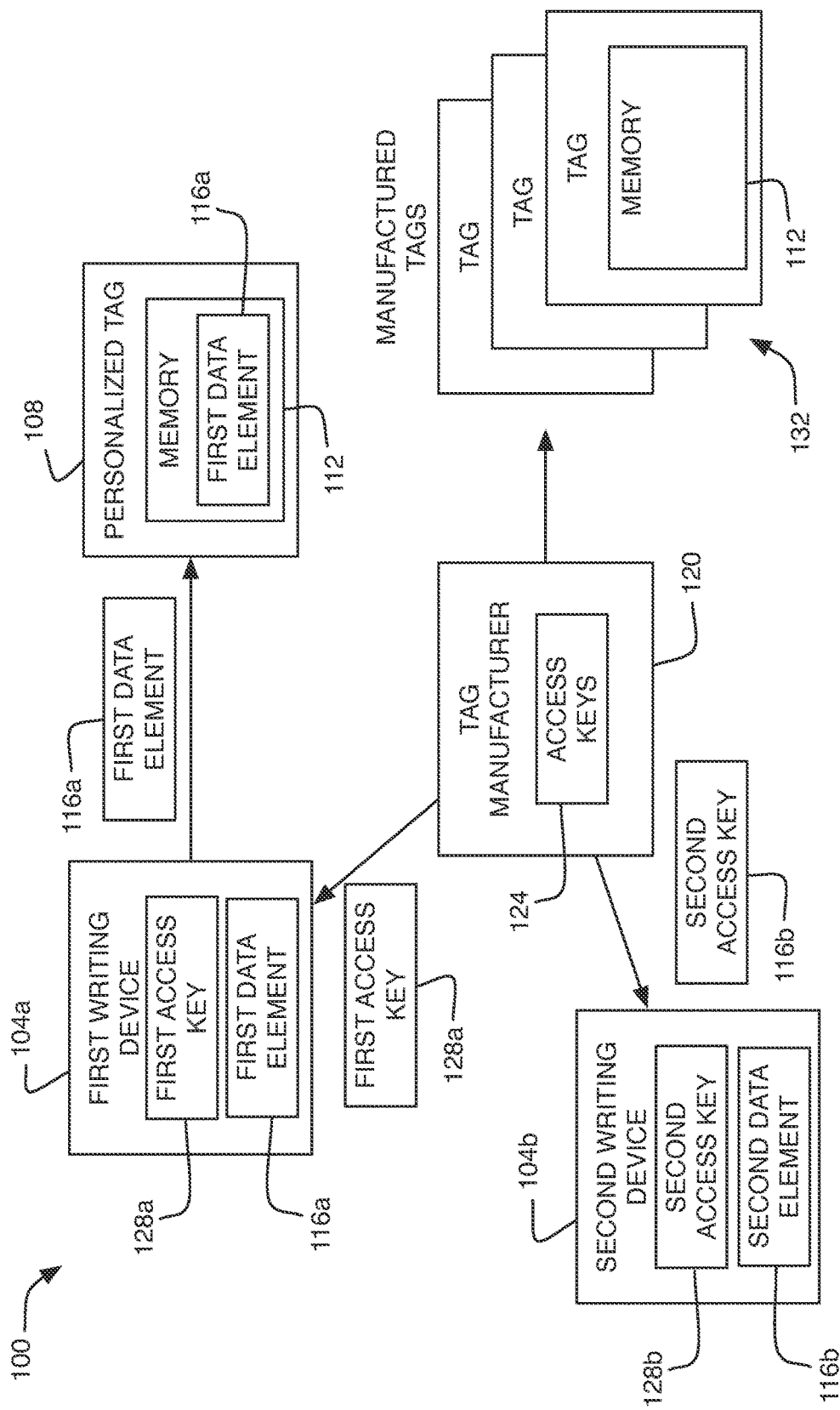
FIG. 1 is a block diagram depicting a tag personalization system in accordance with embodiments of the present disclosure.

With reference initially to FIG. 1 an illustrative system 100 for personalizing one or more tags from a population of manufactured tags 132 will be described in accordance with at least some embodiments of the present disclosure. The depicted system 100 includes one or more personalized tags 108 and a population of manufactured tags 132 that have yet to be personalized by a personalization entity. The tags 108, 132 may be manufactured by a tag manufacturer 120 that produces the tags 108, 132 with memory 112 and other required hardware and/or software components. As will be discussed in further detail herein, the tag manufacturer 120 may correspond to one example of a personalization entity that is responsible for personalizing a tag in a first step before it is personalized by another, different entity.

Personalization of a tag may be performed with one or more writing devices 104a, 104b. The writing devices 104a, 104b may be owned and/or operated by the tag manufacturer 120 or by other different personalization entities. The tag manufacturer 120 may produce the tags 108, 132 in such a way that personalization thereof is controlled by access keys 124. Specifically, the manufacturer may write-protect the memory 112 of the tags 108, 132 with one or more access keys 124 such that only an writing devices that present or can cryptographically be proven to hold a valid access key (e.g., from the access keys 124) to the tag 108, 132 are allowed to personalize the tag (e.g., write a data element thereto).

In accordance with at least some embodiments, the tag manufacturer 120 may utilize a first writing device 104a to write a first data element 116a to a tag, thereby creating a personalized tag 108. Personalization by the tag manufacturer 120 may be relatively straight-forward since the tag manufacturer 120 will not need to provide an access key to another entity. In some embodiments, the first data element 116a may be written to the memory 112 of the tag 108 and may be secured with a first access key 128a. Thus, if the first writing device 104a does not present a valid first access key 128a to the tag 108, the tag 108 may reject the write command issued by the first writing device 104a and may, therefore, not store the first data element 116a in its memory 112. In some embodiments, the tag manufacturer 120 may authenticate with the tag 108 using symmetric keys. However, is should be appreciated that an asymmetric key pair (e.g., public-private key pair) may be used by the tag manufacturer 120 to authenticate itself prior to writing a data element to the tag 108.

Where the tag manufacturer 120 does not control the first writing device 104a, the tag manufacturer 120 may need to provide a first access key 128a to a personalization entity that does operate the first writing device 104a. In some embodiments, the first access key 128a provided to the personalization entity may correspond to a public key from a public-private key pair and the private key from the public-private key pair may be stored in the memory 112 of the tag when manufactured. It should be appreciated, however, that a symmetric key pair (e.g., private-private key pair) may be used by the personalization entity to authenticate itself prior to writing a data element to the tag 108.

As shown in FIG. 1, the tag manufacturer 120 may distribute other keys from the access keys 124 to other entities. For instance, a second access key 116b may be provided to a second personalization entity that uses a second writing device 104b to write a second data element 116b to a tag 108, 132. As can be appreciated, while FIG. 1 depicts only two writing devices 104a, 104b and two access keys 128a, 128b, embodiments of the present disclosure are not so limited. In fact, the access keys 124 may include one, two, three, . . . , twenty, etc. keys and some of all of the access keys 124 may be written to each manufactured tag 132. In some embodiments, only a subset of all access keys 124 maintained by the tag manufacturer 120 are written to a set of manufactured tag 132, thereby enabling the tag manufacturer 120 to control which personalization entities are allowed to personalize certain of the manufactured tags 132. In other words, the tag manufacturer 120 may produce one set of tags for personalization by one set of personalization entities and another set of tags for personalization by another set of personalization entities.

As will be discussed in further detail herein, the first and second writing devices 104a, 104b may correspond to the same device or different devices. Additionally, the writing devices 104a, 104b may be owned and operated by a common entity or by different entities without departing from the scope of the present disclosure.

With reference now to FIGS. 2A-2D, details of a process for writing data to a tag, thereby creating a personalized tag 108 will be described in accordance with at least some embodiments of the present disclosure. With initial reference to FIG. 2A, a first step in the writing process is depicted. The first step in the writing process begins with a first writing device 204 sending a first write command to a tag 208 (step S201). The first writing device 204 may be similar or identical to the first writing device 104a and the tag 208 may correspond to one of the manufactured tags 132 and/or the personalized tag 108.

The write command may be issued in accordance with communication protocols supported by the tag 208 and/or first writing device 204. Specifically, the tag 208 may be configured to support a number of different communication protocols via its communication interface 212. Examples of the communication protocols that may be supported by the tag 208 and more specifically the interface 212 of the tag 208 include, without limitation, NFC protocol, Bluetooth, UHF protocols, HF protocols, or any other RF-based proximity communication protocol.

In some embodiments, the communication channel established between the first writing device 204 and tag 208 may correspond to a RF inductive coupling between antennas of each device. The inductive coupling between the first writing device 204 and tag 208 may depend upon a relative proximity of the two devices. Thus, the communication channel may correspond to a wireless communication channel such as an NFC channel. Other wireless and RF-based proximity protocols such as Bluetooth, WiFi (e.g., IEEE 802.11N), and the like may also be used to establish a communication channel between the first writing device 204 and tag 208. The channel may be established directly between the two devices or it may be established indirectly (e.g., by passing through a wireless router, server, and/or the like). In other embodiments, the communication channel may be wired (e.g., via a Universal Serial Bus (USB) wire, Ethernet wire, etc.).

In some embodiments, the first writing device 204 may correspond to any type of electro-mechanical device capable of interacting with the tag 208. Regardless of whether the communication channel is a wired or wireless channel, the process begins with the first writing device 204 transmitting the write command to the tag 208. The write command may include data (e.g., a first data element 116a) that the first writing device 204 is attempting to write to memory 112 or the write command may simply include a request to write data to the tag 208. Additionally or alternatively, the write command may simply include the first access key 128a maintained by the first writing device 204. In this scenario, the write command may also include a request for authentication with the tag 208.

Upon receiving the write command, the tag 208 may begin an authentication protocol in an access control applet 216 stored within memory 112. The access control applet 216 may correspond to a lightweight application stored in the memory 112 of the tag 208 that is responsible for controlling data elements written to the memory 112. In other words, the access control applet 216 may provide a security mechanism that protects the data already written to the memory 112 and/or data locations that have not yet had data written thereto. The access control applet 216 may include an access control list 220 and access keys 128a, 128b (which may match distributed keys or correspond to keys from a public-private key pair). The access keys 128a, 128b may not be the only access keys written to the tag 208; however, for simplicity of illustration only two access keys 128a, 128b are depicted as initially being stored in the access control applet 216. As discussed in FIG. 1, the first and second access keys 128a, 128b may be written to the tag 208 by the tag manufacturer 120 to control write access to the memory 112.

When the access control applet 216 receives a write request is may respond to the first writing device 204 with a request for an access key, if the access key was not originally provided with the write request in step S201. Upon receiving the access key from the first writing device 204, the access control applet 216 will initiate an authentication protocol in which the access control applet 216 will compare the key received from the first writing device 204 with some or all of the access keys stored locally within memory 112. This comparison may be done with the assistance of the access control list 220 or the comparison may be made directly with each of the access keys 128a, 128b stored in memory 112.

Figure 2A:
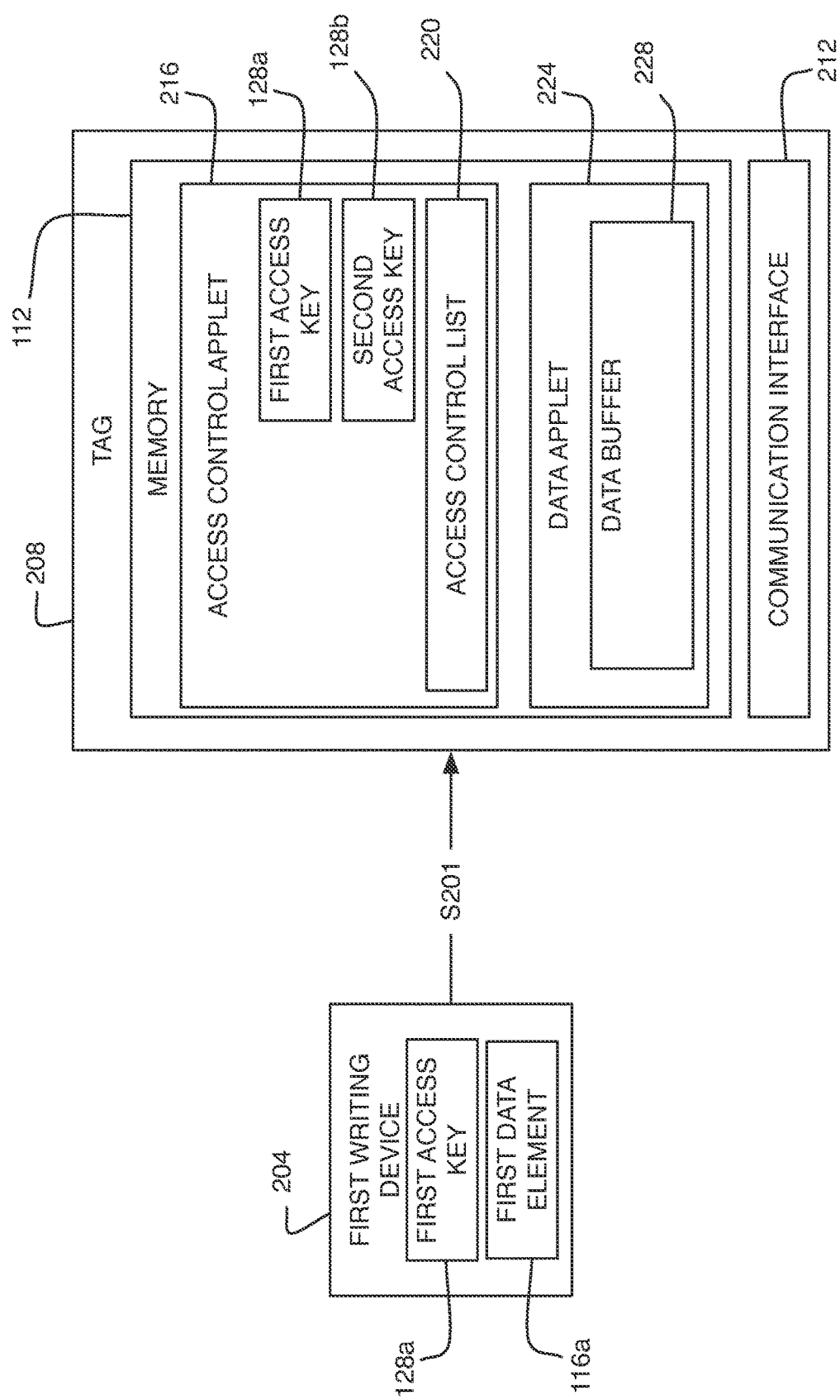
FIG. 2A is a block diagram depicting a first step in writing a data element to a tag in accordance with embodiments of the present disclosure.
Figure 2B:
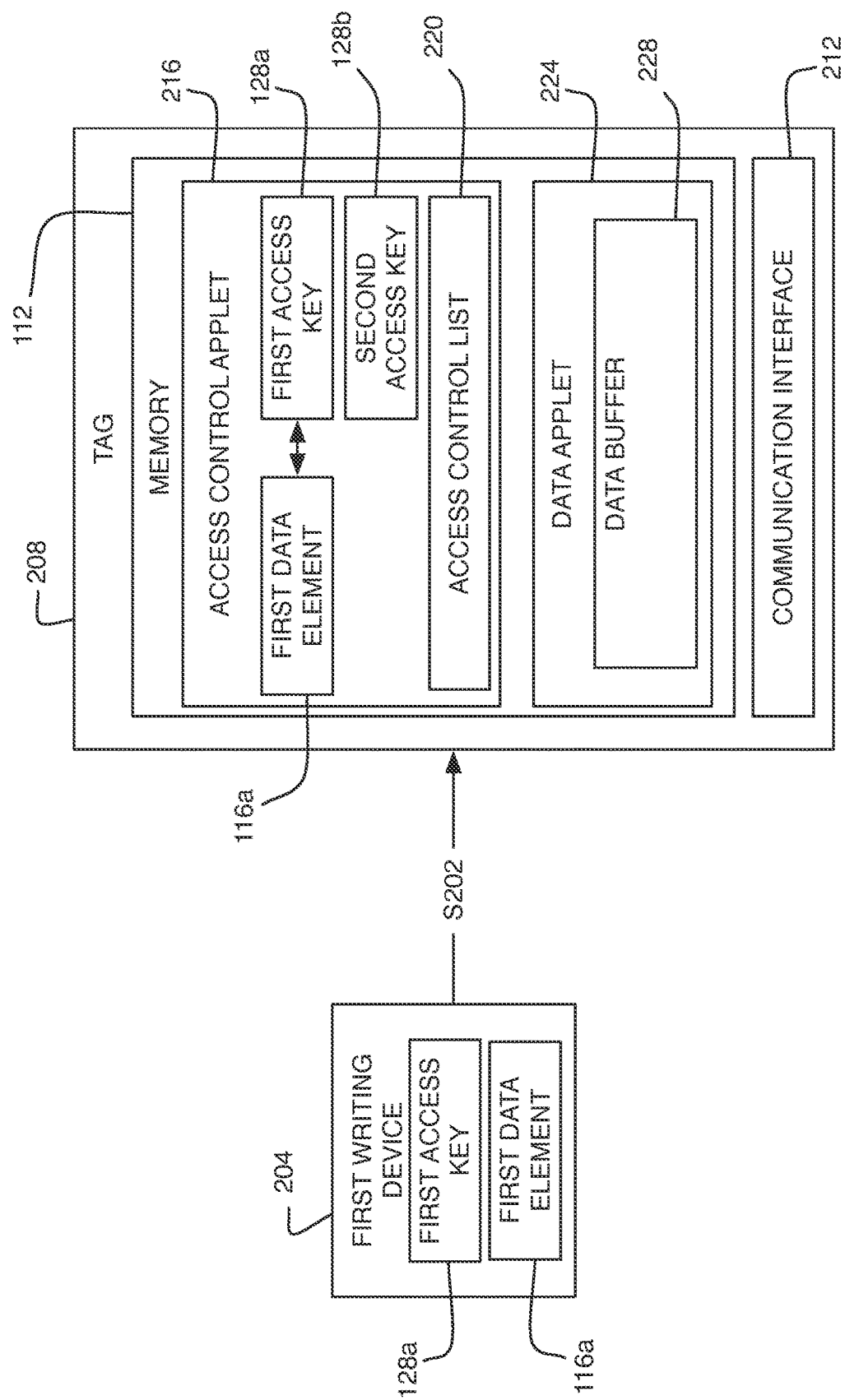
FIG. 2B is a block diagram depicting a second step in writing a data element to a tag in accordance with embodiments of the present disclosure.

As shown in FIG. 2B, if the access control applet 216 determines that the key received from the first writing device 204 matches an access key stored in memory 112 (e.g., the first access key 128a was received from the first writing device 204 or a public key complimenting the first access key 128a was received from the first writing device 204), or that there is cryptographic proof that the first device 204 is in possession of the access key stored in memory 112 (e.g. via a signed nonce or a challenge response mechanism), the access control applet 216 may proceed by allowing the first writing device 204 to write a first data element 116a thereto (step S202). As used herein, the access control applet 216 may identify "matching" keys by identifying keys that perfectly match one another (e.g., private-private key pair) or that compliment one another (e.g., public-private key pair). Accordingly, the use of the term "matching" is intended to encompass both perfect matches and complimentary matches.

When the first data element 116a is written to the access control applet 216, the access control list 220 may be updated to reflect a mapping of the first data element 116a to the first access key 128a. In other words, the access control list 220 may contain information that maps each access key 128a, 128b to a particular data element and/or to a particular location in memory 112. The access control list 220 may be used to restrict data writes or overwrites to only those writing devices that present a valid access key.

In some embodiments, the first data element 116a may be stored in memory 112 in accordance with the type of tag 208 being used. For instance, where the tag 208 corresponds to an NFC tag, the first data element 116a may be stored as one or more NDEF records. As can be appreciated, the first data element 116a may be stored as any type of data structure or collection of data structures and the format of that data structure may depend upon the type of the tag 208. Once the first data element 116a has been written to the tag 208, the tag 208 may be considered a personalized tag 108. This may be the case regardless of whether or not a personalization entity or the tag manufacturer 120 was operating the first writing device 204.

Figure 2C:
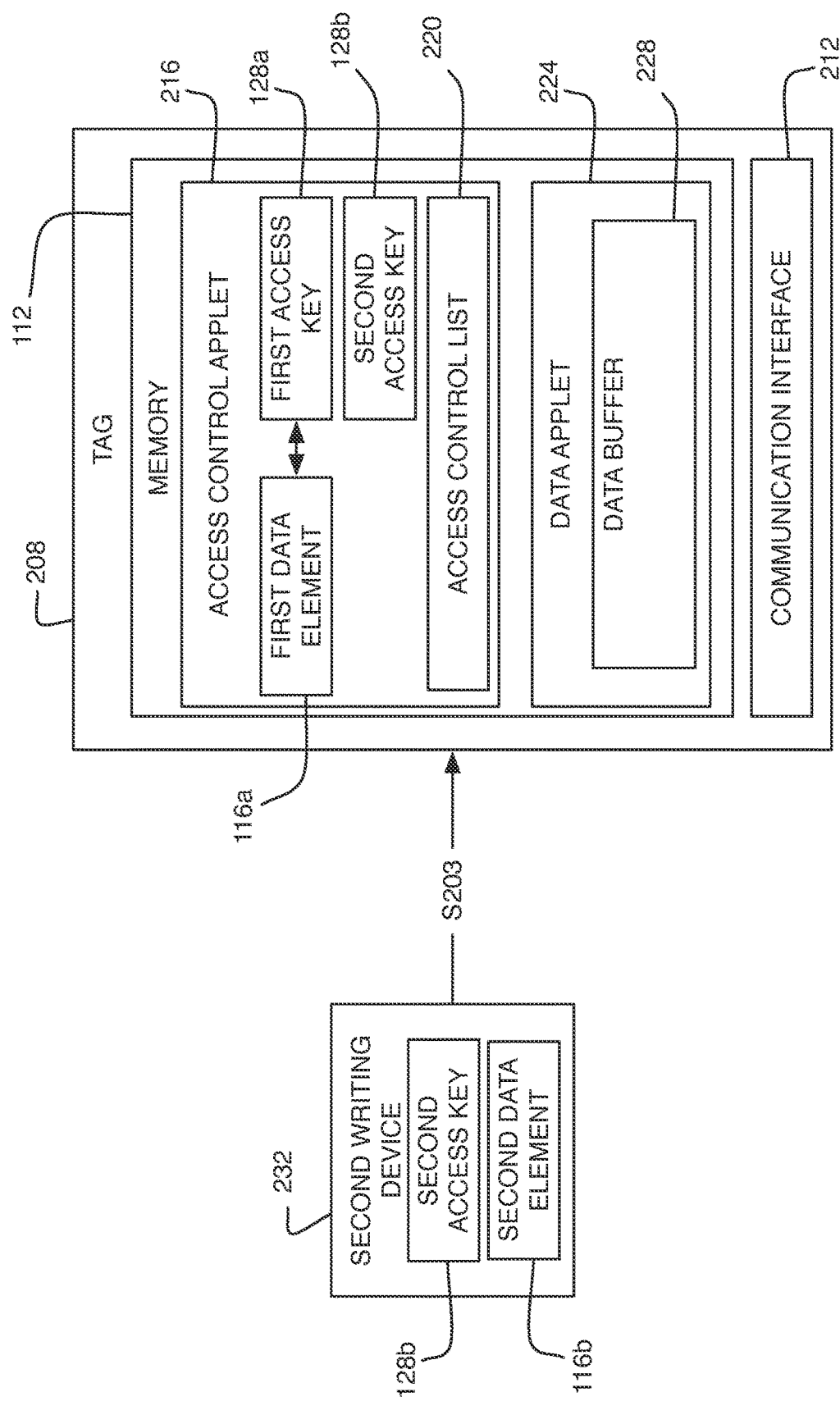
FIG. 2C is a block diagram depicting a third step in writing a data element to a tag in accordance with embodiments of the present disclosure.
Figure 2D:
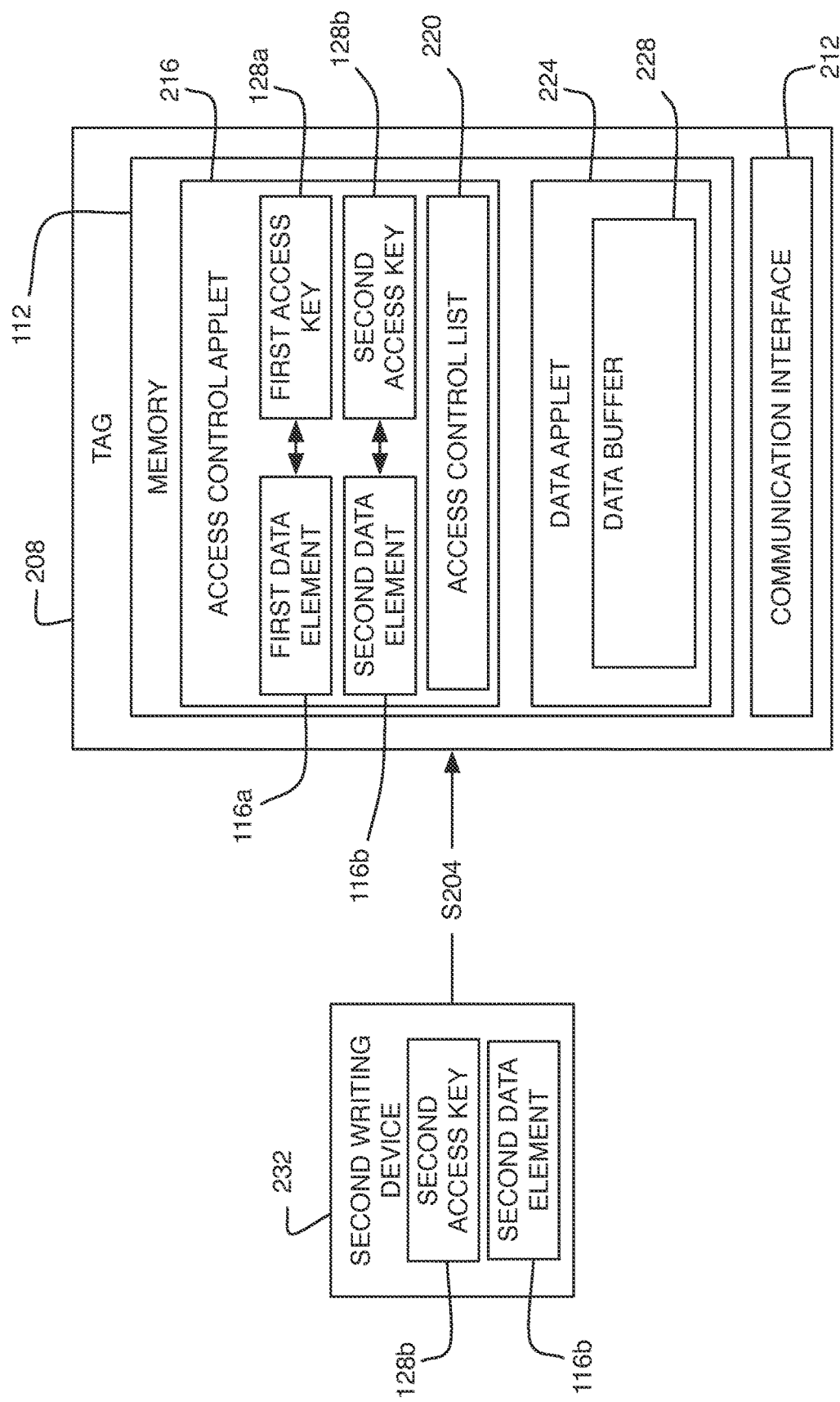
FIG. 2D is a block diagram depicting a fourth step in writing a data element to a tag in accordance with embodiments of the present disclosure.

Further personalization of the tag 208 is shown in FIG. 2C when a second writing device 232 begins a process of writing a second data element 116b to the tag 208. In particular, the second writing device 232 issues a write command to the tag (step S203). The type write command issued by the second writing device 232 may be similar or identical to the type of write command issued by the first writing device 204. It should be appreciated, however, that the second writing device 232 may issue a write command with a second access key 128b instead of the first access key 128a. It should also be appreciated that the first writing device 204 and second writing device 232 may actually be the same device without departing from the scope of the present disclosure.

Upon receiving the write command from the second writing device 232, the access control applet 216 may perform an authentication process in which an access key received from the second writing device 232 is compared with keys listed in the access control list 220 and/or compared directly to keys stored in memory 112 or that there is cryptographic proof that the second device 232 is in possession of the access key stored in memory 112 (e.g. via a signed nonce or a challenge response mechanism). If the access control applet 216 determines that the second writing device 232 has presented a valid key (e.g., a key that matches a locally-stored access key, such as the second access key 128b), the access control applet 216 will continue by completing the write process. In particular, the access control applet 216 will allow the second data element 116b to be written to memory 112 (step S204).

As with the first data element 116a, the second data element 116b may be stored in memory with a reference to the second access key 128b. In some embodiments, the mapping between the second data element 116b and the second access key 128b may be maintained in the access control list 220. Any subsequent re-writing of the second data element 116b may require the writing device to present the second access key 128b to be provided by the writing device. This helps secure the data element and/or the memory location used to store the data element.

Figure 3:
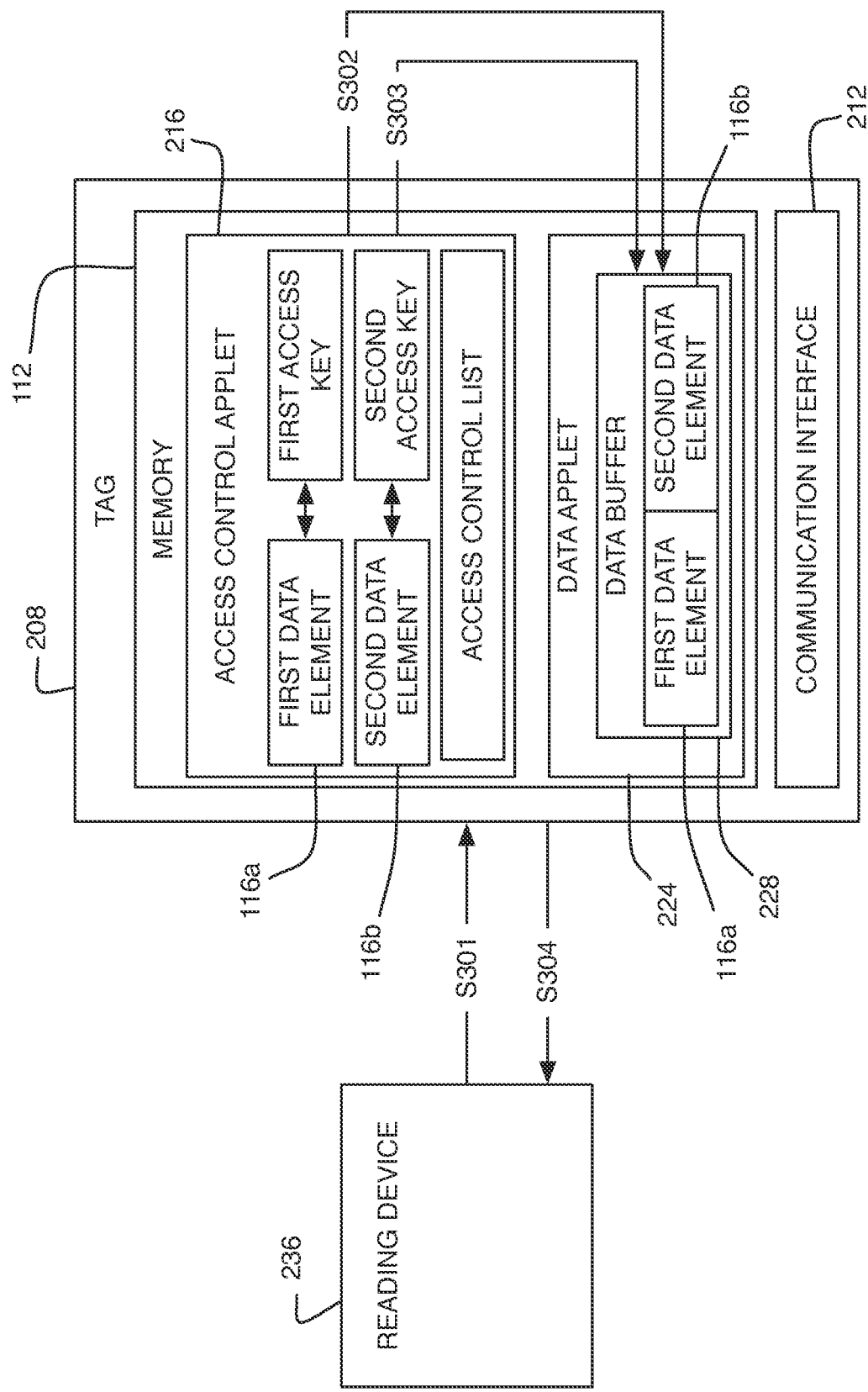
FIG. 3 depicts a reading process in accordance with embodiments of the present disclosure.

With reference now to FIG. 3, a process of reading one or more data elements 116a, 116b from the memory 112 will be described in accordance with at least some embodiments of the present disclosure. The reading process is initiated when a reading device 236 provides the tag 208 with a read command (step S301). The reading device 236 may correspond to a same or similar device as the writing devices or the reading device 236 may be a different device. The read command may be directed to a particular application on the tag 208, specifically the data applet 224. Even more specifically, the reading device 236 may issue the read request and address the request to the data applet 224 stored on the tag 208. In some embodiments, the data applet 224 corresponds to a lightweight application that is separate and distinct (e.g., occupies separate code space and is operated with separate processing resources) than the access control applet 216. It should be appreciated that the tag 208 may comprise one, two, three, or more different data applets to support read operations for different applications and/or to support different reading devices 236. The single instance of a data applet 224 is depicted for simplicity.

Upon receiving the read request, the data applet 224 may identify the data elements that are being requested by the reading device 236 and may further identify where the data elements are stored by the access control applet 216. Upon identifying the location of the requested data elements 116a, 116b, the data applet 224 may copy the necessary data elements 116a, 116b to a data buffer 228 maintained by the data applet 224 (steps S302 and S303).

The data buffer 228 may correspond to a memory location where the data elements 116a, 116b can be temporarily stored by the data applet 224 such that the data applet 224 can provide the data elements 116a, 116b to the reading device 236. Once the copies of the data elements 116a, 116b have been stored in the data buffer 228, the data applet 224 may provide the requested data elements 116a, 116b back to the reading device 236 (step S304). In some embodiments, the data applet 224 may also be configured to perform calculations and/or cryptographic operations on the data elements 116a, 116b. In other words, the data applet 224 may modify the data elements 116a, 116b with a calculation and/or a cryptographic operation prior to providing the data elements (or modified versions thereof) back to the reading device 236.

If the data applet 224 is providing multiple data elements back to the reading device 236, the data applet 224 may concatenate the data elements prior to transmitting the data back in step S304. Alternatively, the data elements 116a, 116b may be provided separately in one or more separate response messages. In some embodiments, the multiple data elements 116a, 116b may be concatenated in a patterned template specified by at least one of the one or more data elements. As an example, if one or both of the data elements 116a, 116b correspond to an NDEF record, then the concatenation of the multiple data elements may be patterned into an NDEF record that contains the information from all of the data elements 116, 116b. The data elements 116a, 116b may correspond to any type of data stored by the tag 208 examples of which include, without limitation, a URL, email address, a phone number, combinations thereof, etc.

Figure 4:
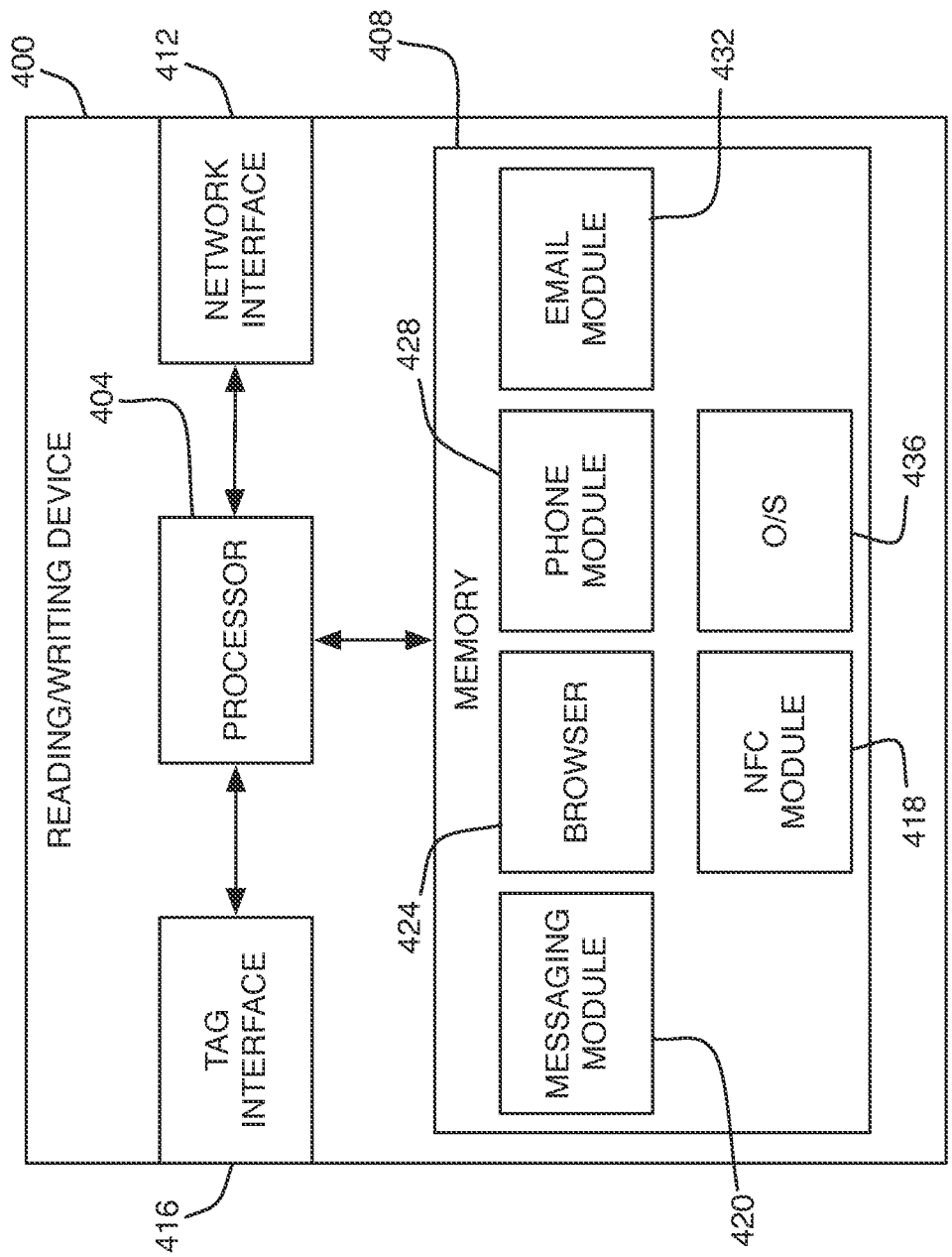
FIG. 4 depicts details of a reading and/or writing device in accordance with embodiments of the present disclosure.

With reference now to FIG. 4, additional details of a reading/writing device 400 will be described in accordance with at least some embodiments of the present disclosure. As can be appreciated, the reading/writing device 400 may correspond to any of the reading and/or writing devices described herein, especially since it is contemplated that reading devices may also operate as writing devices.

The reading/writing device 400 may correspond to hand-held reader, a mobile communication device (e.g., smart phone, tablet, laptop, Personal Digital Assistant (PDA), smart watch, remote control, smart vehicle or car, etc.), or the like. In some embodiments, the reading/writing device 400 may communicate with the tag using RF inductive coupling (e.g., at frequencies of 125 kHz, 13.56 MHz, etc.). Other protocols such as Bluetooth and/or WiFi may also be used to facilitate communications between the reading/writing device 400 and tag.

The reading/writing device 400 may correspond to a mobile communication device such as a cellular phone, smart phone, tablet, laptop, or any other device that is NFC-enabled, Bluetooth-enabled, or otherwise configured to communicate via one or more proximity-based RF communication protocols or non-proximity-based RF communication protocols such as ZigBee, for example. The reading/writing device 400 is depicted as comprising a processor 404, memory 408, a tag interface 416, and a network interface 412. In some embodiments, the processor 404 may correspond to a plurality of processors, each configured to perform certain operations for the reading/writing device 400. As an example, the reading/writing device 400 may have dedicated processors for its NFC functions and other functions. In some embodiments, the components of the reading/writing device 400 may be connected together via a data bus or similar architecture. Thus, although the components are depicted as being connected via the central processor 404, such an arrangement of components is not required.

The processor 404 may correspond to a microprocessor, Central Processing Unit (CPU), collection of processors or CPUs, or the like. In some embodiments, the processor 404 may be configured to execute instructions stored in memory 408, thereby providing functionality to the reading/writing device 400.

The memory 408 may comprise a number of modules or instruction sets (e.g., applications, drivers, etc.) stored therein. In some embodiments, the memory 408 may include volatile and/or non-volatile memory. As some non-limiting examples, the memory 408 may include an NFC module 418, a messaging module 420, a browser 424, a phone module 428, an email module 432, and an Operating System (O/S) 436. Although not depicted, the memory 408 may further include one or more applications that are purpose-built to communicate with a tag 208 and, in particular, either write data to the tag 208 via the access control applet 216 or read data from the tag 208 via the data applet 224.

The NFC module 418 may comprise instructions that, when executed by the processor 404, enable the NFC functionality of the reading/writing device 400 and/or any other functions for interacting with a tag 208. For instance, the NFC module 418 may be responsible for causing the reading/writing device 400 to operate in a card emulation mode, a read/write mode, and/or a peer-to-peer mode. The NFC module 418 may also correspond to a specific portion of memory where sensitive data normally communicated via NFC (e.g., data elements 116a, 116b, access keys 128a, 128b, encryption algorithms, etc.) is securely stored on the reading/writing device 400. As an example, the NFC module 418 may include a secure element such as a SIM card or an embedded secure element where NFC data is stored in an encryption fashion. Thus, the NFC module 418 may correspond to specific memory or memory locations in addition to providing the executable instructions for the processor 404. Alternatively or additionally, the NFC module 418 may be replaced with or supplemented with a Bluetooth module that enables the reading/writing device 400 to communicate with other devices (e.g., the tag 208) via Bluetooth. It should be appreciated that the reading/writing device 400 may be equipped for both Bluetooth and NFC communications. In some embodiments, the Bluetooth communications may occur via the network interface 412 or the tag interface 416.

When executed, the NFC module 418 or Bluetooth module may cause the processor 404 to exchange information with other devices according to known NFC or Bluetooth protocols via the tag interface 416 or network interface 412. Where NFC is employed, the tag interface 416 may include a coil or antenna that creates an inductive coupling with other RF-enabled devices. The size of the tag interface 416 may depend upon the overall size of the reading/writing device 400 as well as other antennas (e.g., network interface 412) contained within the reading/writing device 400.

The other phone functionality of the reading/writing device 400 may be provided by the other modules 420, 424, 428, 432 and O/S 436 stored in memory 408. As examples, the O/S 436 may correspond to a mobile operating system specifically designed for smart phones or the like. Non-limiting examples of an O/S 436 include Android®, iOS®, BlackberryOS®, Windows®, Windows Mobile®, and the like. The O/S 436 may be responsible for providing the basic functionality of the phone (e.g., controlling user input and output functions, microphone functions, coordinating drivers, etc.) in addition to coordinating operations of the applications and other modules stored in memory 408.

The messaging module 420 may correspond to an application that enables the reading/writing device 400 to communication SMS, MMS, and other messages via a cellular communication network. Alternatively or additionally, the messaging module 420 may utilize social media channels.

The browser 424 may provide the reading/writing device 400 with the ability to browse the Internet, for example. The browser 424, in some embodiments, corresponds to an application that enables the reading/writing device 400 to exchange information with servers and other data providers over a communication network using known Internet Protocols (e.g., HTTP, HTML, XML, etc.). Non-limiting examples of browsers 424 include Internet Explorer®, Safari®, Google Chrome®, mobile versions thereof, etc. In some embodiments, the browser 424 corresponds to at least a portion of the authentication service interface 336.

The phone module 428 may provide the reading/writing device 400 with the ability to initiate and respond to calls (e.g., voice calls, video calls, multi-media collaborations, etc.). The phone module 428 may also enable a user to perform advanced communication functions such as accessing voicemail, establishing conference calls, etc.

The email module 432 may provide the reading/writing device 400 with the ability to exchange electronic mail messages with other devices over a communication network. As examples, the email module 432 may specifically support email communications. It should also be appreciated that the email module 432 may be combined with the messaging module 420 to support other types of communications such as social media communications (e.g., Facebook®, Twitter®, etc.), Short Message Service (SMS) messaging, Multimedia Messaging Services (MMS), and so on.

Communications between the reading/writing device 400 and a broader communication network may be facilitated by the network interface 412, which may actually include several interfaces to different networks or network types. For instance, the network interface 412 may comprise a cellular network interface that enables the reading/writing device 400 to interact with a cellular network, which is usually provided by a Mobile Network Operator (MNO). Alternatively or additionally, the network interface 412 may comprise a Bluetooth interface, Infrared interface, etc. The network interface 412 may alternatively or additionally include an 802.11N interface (e.g., Wi-Fi interface), a Universal Serial Bus (USB) port, or any other wired or wireless interface to the communication bus of the reading/writing device 400.

Figure 5:
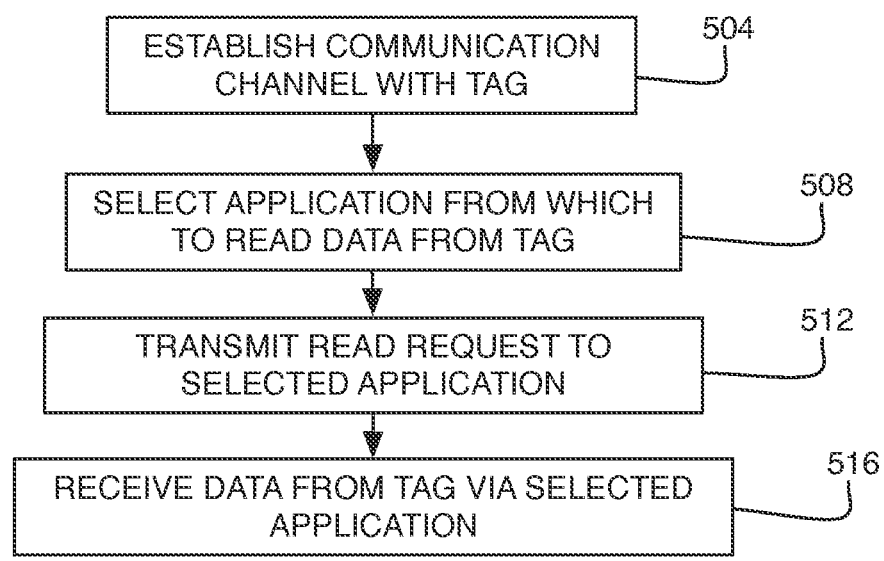
FIG. 5 depicts details of a reading process in accordance with embodiments of the present disclosure.

With reference now to FIG. 5, additional details of a process for reading data from a tag 208 with a reading device will be described in accordance with embodiments of the present disclosure. The process begins when the reading device establishes a communication channel with the tag 208 (step 504). The communication channel may correspond to a proximity-based RF communication channel such as an NFC channel, a Bluetooth channel, a WiFi channel, or the like. Alternatively or additionally, the channel may be established over a wired connection between the devices (e.g., via USB, serial ports, etc.).

Once the devices are connected, the reading device may select the application from which the reading device wants to read data from the tag 208 (step 508). In some embodiments, the selection may be made by default while in other embodiments, the reading device may be used to enable a user to select from among a list of applications on the tag. Once the appropriate application has been selected (e.g., a version of data applet 224 is selected), the reading device transmits a read request to the selected application (step 512). The selected application on the tag 208 then obtains the requested data elements and provides such data elements back to the reading device as described in connection with FIG. 3 (step 516).

Figure 6:
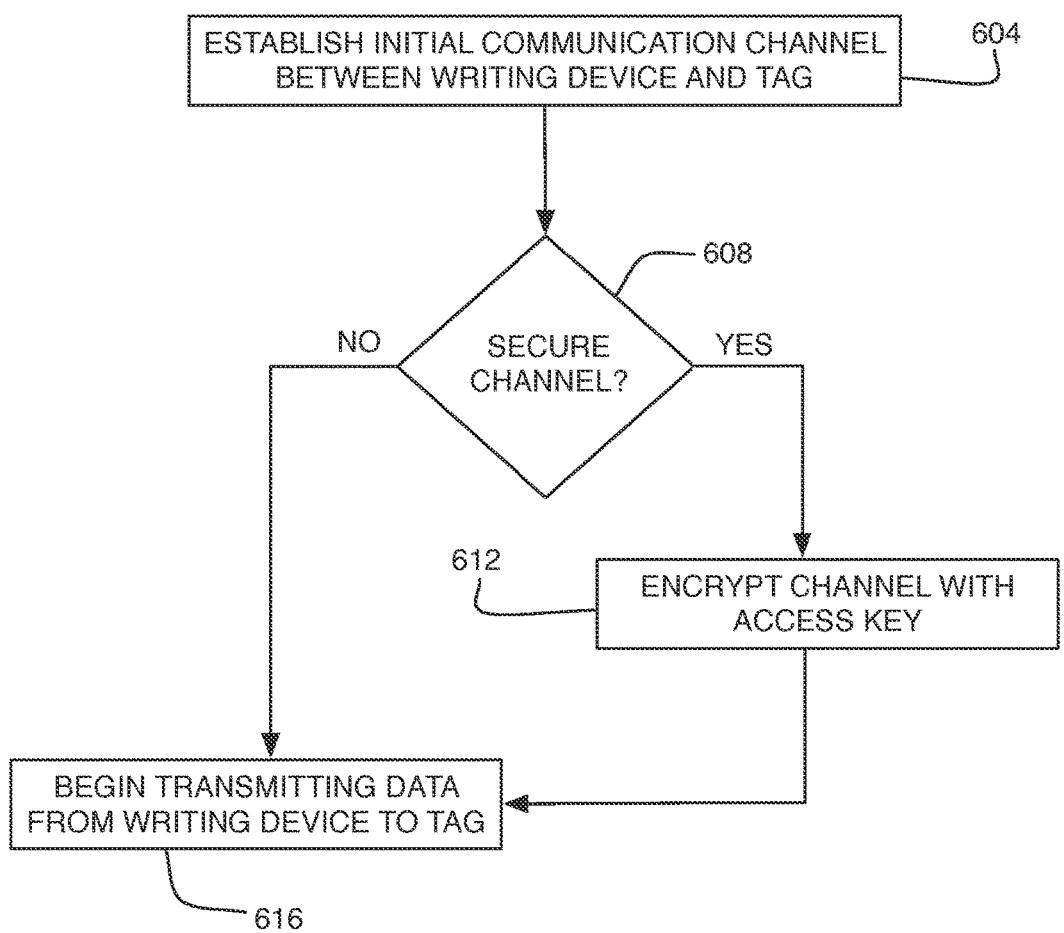
FIG. 6 depicts a secure writing process in accordance with embodiments of the present disclosure.

With reference now to FIG. 6, a method of optionally securing a communication channel between a writing device and the tag 208 will be described in accordance with embodiments of the present disclosure. The process begins when the writing device initially establishes a communication channel with the tag 208 (step 604). The communication channel may correspond to a proximity-based RF communication channel, such as an NFC channel, a Bluetooth channel, a WiFi channel, etc. At this point, the communication channel is not secured and, for that reason, the writing device may refrain from transmitting any sensitive data over the communication channel.

The process continues with the determination of whether or not a secure communication channel will be used to carry the data elements that are ultimately going to be written to the tag 208 by the writing device (step 608). If the query of step 608 is answered negatively, then the writing device and tag 208 will proceed with the authentication protocol by exchanging access keys and, if authentication is successful, the writing device will begin writing one or more data elements to the tag 208 (step 616).

On the other hand, if the query of step 608 is answered positively, then the process continues with the writing device and tag 208 encrypting the communication channel between the devices (step 612). In some embodiments, the keys used to write-protect the memory 216 of the tag 208 may also be used to encrypt the communication channel between the devices. Specifically, the writing device may use its version of the access key 128a, 128b to encrypt any messages transmitted to the tag 208 and the tag 208 may use its version of the access key 128a, 128b to decrypt the messages received from the writing device. Advantageously, the use of the access keys for encryption/decryption may obviate the need for a different authentication step. Instead, the tag 208 may assume that the writing device is trusted by virtue of the fact that the messages received from the writing device are capable of being decrypted by a key stored on the tag 208. Failure of the tag 208 to properly decrypt a message from the writing device provides an indication that the key used to encrypt the message was not a valid key. Once the channel has been decrypted, then the process can continue to step 616.

Figure 7:
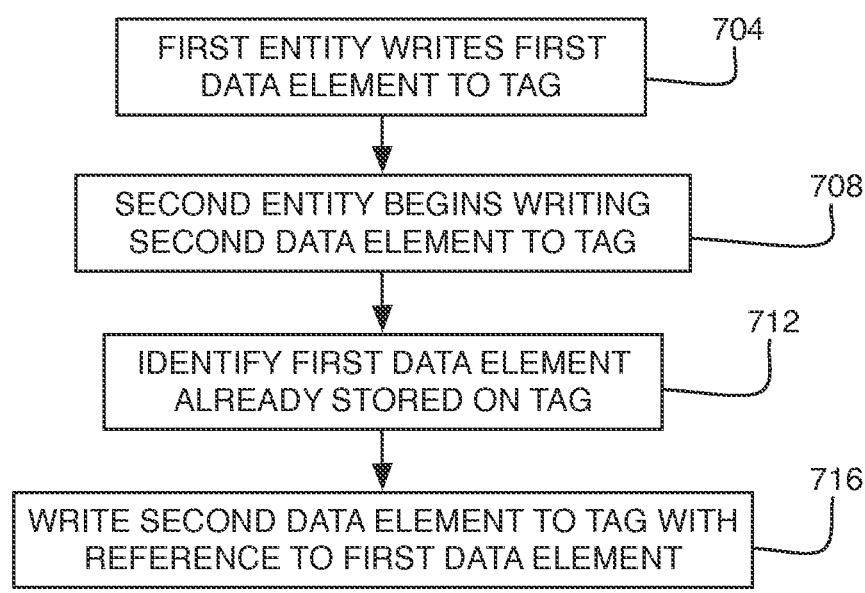
FIG. 7 depicts details of a sequential personalization process in accordance with embodiments of the present disclosure.

With reference now to FIG. 7, a sequential personalization process will be described in accordance with at least some embodiments of the present disclosure. The process begins when a first entity writes a first data element 116a to the tag 208 (step 704). The first entity may correspond to the tag manufacturer 120 or to a first personalization entity. The first data element 116a may be stored in the access control applet 216 and may be write-protected by and associated with the first access key 128a. The association of the first data element 116a and first access key 128a may be stored in the access control list 220 as a mapping of the two data structures.

The process continues with a second entity initiating a process of writing a second data element 116b to the tag 208 (step 708). The second entity may be the same as the first entity or different from the first entity. Moreover, the second entity may correspond to the tag manufacturer 120 or to a second personalization entity. Before or while the second data element 116b is being written to the tag 208, the access control applet 216 may determine that the second data element 116b is going to be written to the tag 208 with a reference to the first data element 116a (step 712). Identification of the first data element 116a and the need to reference the first data element 116a with the second data element 116b may be done automatically by the access control applet 216 or in response to receiving an user instruction to store the second data element 116b with reference to the first data element 116a. The first data element 116a may be found via reference to the access control list 220. Furthermore, reference to the first data element 116a may be protected by the first access key 128a and/or the second access key 128b.

Once the location of the first data element 116a has been identified, the process continues with the access control applet 216 writing the second data element 116b to the tag 208 with reference to the first data element 116a (step 716). In some embodiments, the reference between data elements may be stored in the access control list 220. In some embodiments, the reference to the first data element 116a may be stored as part of the second data element 116b (e.g., the second data element 116b may be stored in addition to storing a pointer or reference to the first data element 116a). In some embodiments, the second data element 116b may reference the first data element 116a by concatenating the first and second data elements to create a third (combined) data element that is eventually stored and referenced by the second access key 128b.

It is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A tag, comprising:
   computer-readable memory including:
      an access control applet having the ability to store one or more data elements;
      one or more access keys;
      an access control list providing a mapping of the one or more access keys to the one or more data elements, wherein the access control applet implements an authentication protocol in response to receiving a write command initiated by a writing device, the authentication protocol including confirming that the writing device which initiated the write command is in possession of the one or more access keys prior to allowing the writing device to write a data element to the memory, wherein a first data element is written to a first memory location having write permissions controlled by a first access key in the one or more access keys, wherein a second data element is written to a second memory location having write permissions controlled by a second access key in the one or more access keys, and wherein the second data element is written to the second memory location with a reference pointer to the first data element even though the first and second data elements were written to memory locations having write permissions controlled by different access keys.

2. The tag of claim 1, wherein the second data element references the first data element by concatenating the first data element and the second data element to create a combined data element that is stored and referenced by the second access key.

3. The tag of claim 1, wherein the first access key is maintained exclusively by a manufacturer of the tag and wherein the second access key is shared with a personalization entity.

4. The tag of claim 1, wherein the first data element is written to the first memory location by a first entity and wherein the second data element is written to the second memory location by a second entity that is different from the first entity.

5. The tag of claim 1, wherein the one or more access keys are also used to create an encrypted communication channel between the writing device and the tag when writing the data element to the memory.

6. The tag of claim 1, wherein the data element written to the memory comprises a Near-Field Communications (NFC) Data Exchange Format (NDEF) record.

7. The tag of claim 1, wherein the access control applet determines that the writing device is in possession of the one or more access keys by cryptographically proving that the writing device is in possession of the one or more access keys.

8. The tag of claim 1, wherein the access control applet determines that the writing device is in possession of the one or more access keys by receiving the one or more access keys from the writing device.

9. The tag of claim 1, wherein the computer-readable memory further includes a data applet that is separate and distinct from the access control applet and that is used to provide the one or more data elements to a reading device by obtaining the one or more data elements from the access control applet and then providing the one or more data elements to the reading device.

10. The tag of claim 9, wherein the data applet is configured to perform at least one of a computational operation and a cryptographic operation on the one or more data elements.

11. The tag of claim 1, wherein communications between the tag and the writing device are performed using at least one of a Near-Field Communications (NFC) protocol, an Ultra-High Frequency (UHF) protocol, a High Frequency (HF) protocol, and a Bluetooth protocol.

12. The tag of claim 1, wherein read permissions for the one or more data elements are not secured with the one or more access keys.

13. A tag, comprising:
computer-readable memory including:
an access control applet having the ability to store one or more data elements;
one or more access keys;
an access control list providing a mapping of the one or more access keys to the one or more data elements, wherein the access control applet implements an authentication protocol in response to receiving a write command from a writing device, the authentication protocol including confirming that the writing device is in possession of the one or more access keys prior to allowing the writing device to write a data element to the memory, wherein the computer-readable memory further includes a data applet that is used to provide the one or more data elements to a reading device by obtaining the one or more data elements from the access control applet and then providing the one or more data elements to the reading device, wherein the data applet comprises a data buffer that temporarily stores copies of the one or more data elements in response to receiving a read request from the reading device and then provides the reading device with the copies of the one or more data elements, wherein the one or more data elements comprise at least two data elements and wherein the data applet concatenates the at least two data elements in a patterned template specified by at least one of the one or more data elements.

14. A method of writing data to memory of a tag, the method comprising:
receiving, at the tag, a first write command initiated by a first writing device;
receiving, at the tag, a nonce signed by a first key;
prior to executing the first write command at the tag, authenticating the first writing device by determining that the signed nonce is valid by regenerating the signature with a stored version of the first key, wherein the stored restored version of the first key is stored in an access control applet maintained in the memory of the tag;
upon authenticating the first writing device, completing the first write command by writing a first data element to the memory;
receiving, at the tag, a second write command initiated by a second writing device;
receiving, at the tag, a nonce signed by a second key;
prior to executing the second write command at the tag, authenticating the second writing device by determining that the signed nonce is valid by regenerating the signature with the stored version of the first key; and
upon authenticating the second writing device, completing the second write command by writing a second data element to the memory, wherein the second data element references the first data element by at least one of: (1) concatenating the first data element with the second data element and (2) storing a reference pointer to the first data element.

15. The method of claim 14, wherein the first writing device is different from the second writing device, wherein the first data element is written to a first memory location, wherein the second data element is written to a second memory location, and wherein the first and second memory locations are write-protected by the first and second access keys, respectively.

16. The method of claim 14, further comprising:
receiving, at the tag, a read command from a reading device, the read command identifying a data applet as a selected data applet from which at least one of the first and second data elements are to be read from the tag;
in response to receiving the read command, copying at least one of the first and second data elements to a data buffer maintained in the selected data applet; and
providing at least one of the first and second data elements to the reading device from the data buffer.

17. The method of claim 16, wherein the first and second data elements are concatenated in a patterned template specified by one of the first and second data element.

18. The method of claim 16, wherein the selected data applet performs at least one of a computation operation and a cryptographic operation on at least one of the first and second data elements.

19. The method of claim 14, wherein at least one of the first and second data elements are written to the memory using an encrypted communications channel, wherein the encrypted communications channel is encrypted with at least one of the following: (i) the first access key, (ii) the second access key, (iii) an ephemeral secure channel key generated using the first access key, (iv) an ephemeral secure channel key generated using the second access key, and (v) an ephemeral secure channel key generated using both the first and second access keys.

20. A non-transitory computer-readable memory, comprising:
   an access control applet having the ability to store one or more data elements;
   one or more access keys; and
   an access control list providing a mapping of the one or more access keys to the one or more data elements, wherein the access control applet implements an authentication protocol in response to receiving a write command initiated by a writing device, the authentication protocol including confirming that the writing device which initiated the write command is in possession of the one or more access keys prior to allowing the writing device to write a data element to the memory, wherein a first data element is written to a first memory location having write permissions controlled by a first access key in the one or more access keys, wherein a second data element is written to a second memory location having write permissions controlled by a second access key in the one or more access keys, and wherein the second data element is written to the second memory location with either a reference pointer to the first data element or a concatenation of the first data element even though the first and second data elements were written to memory locations having write permissions controlled by different access keys.

* * * * *